R. G. HARDGRAVE & C. T. ADAIR.
TRANSMISSION GEARING FOR MOTOR VEHICLES.
APPLICATION FILED DEC. 3, 1910.
1,028,876.
Patented June 11, 1912.
2 SHEETS—SHEET 2.
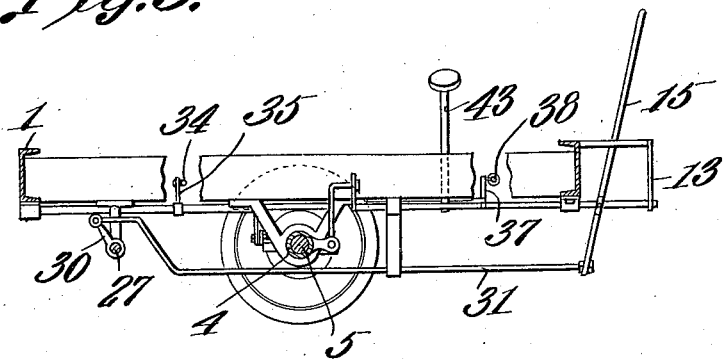
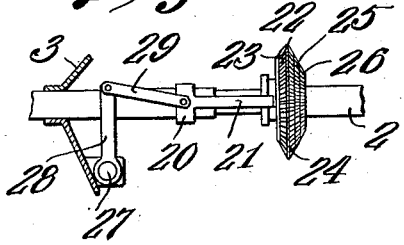
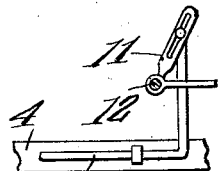
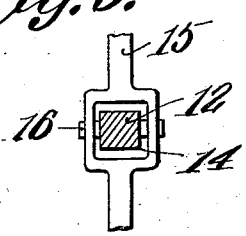
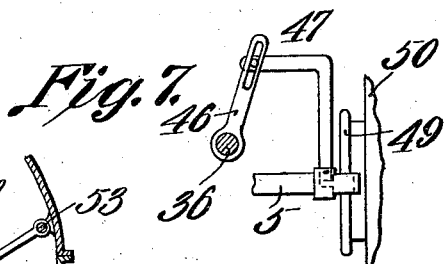
Robert G. Hardgrave and
Charles T. Adair,
Inventors
Witnesses
by C. A. Snow & Co.
Attorneys

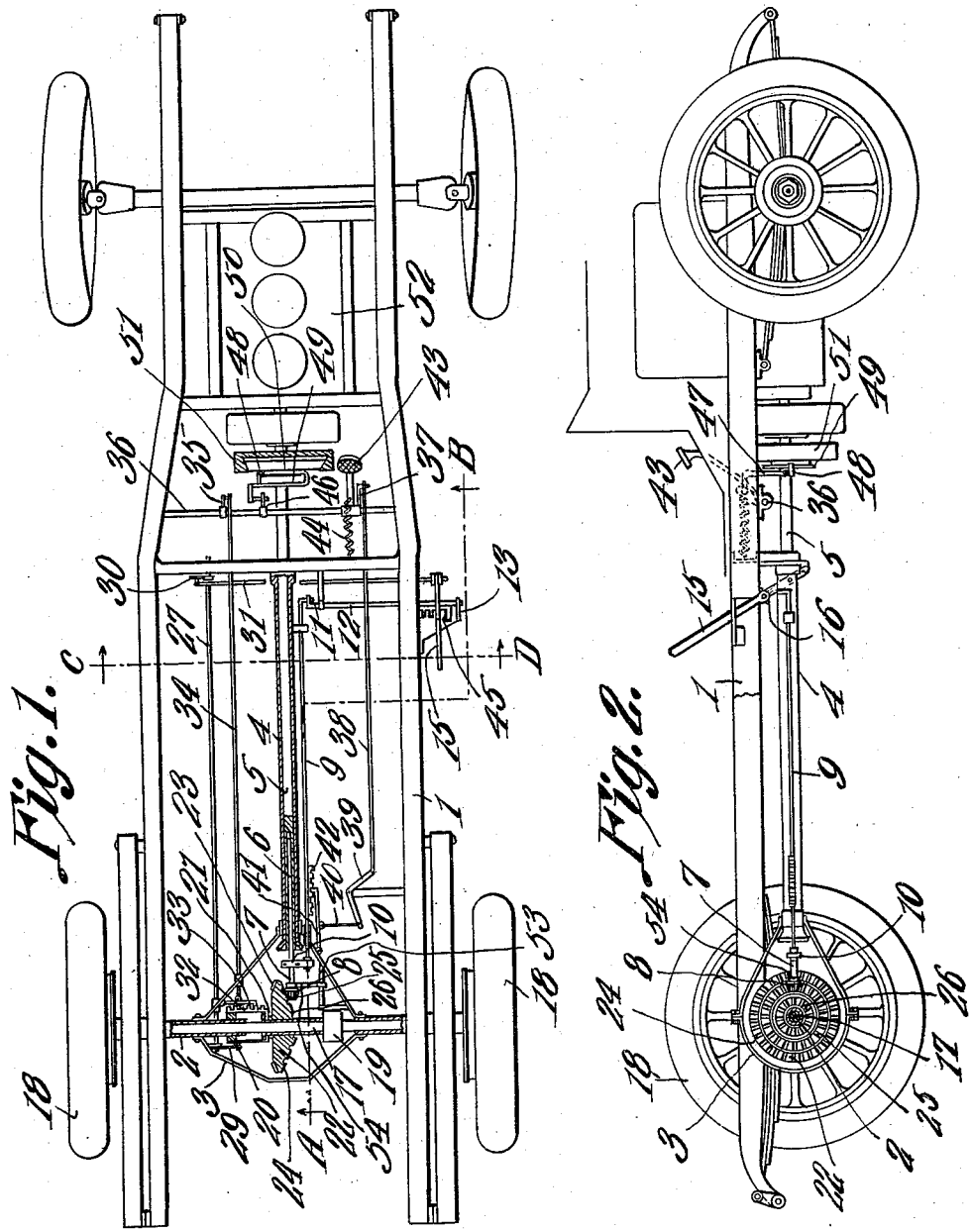

UNITED STATES PATENT OFFICE.

ROBERT GASTON HARDGRAVE AND CHARLES T. ADAIR, OF TUCUMCARI, NEW MEXICO.

TRANSMISSION-GEARING FOR MOTOR-VEHICLES.

1,028,876.   Specification of Letters Patent.   Patented June 11, 1912.

Application filed December 3, 1910. Serial No. 595,525.

*To all whom it may concern:*

Be it known that we, ROBERT G. HARDGRAVE and CHARLES T. ADAIR, citizens of the United States, residing at Tucumcari, in the county of Quay, State of New Mexico, have invented a new and useful Transmission-Gearing for Motor-Vehicles, of which the following is a specification.

This invention relates to transmission gearing for use on motor vehicles, its object being to provide two coöperating shiftable gears under the control of a single lever and which can be moved relative to each other so as to vary the speed of rotation of the driven gear and to reverse said gear.

Another object is to provide mechanism of this character utilizing but two gears, to wit: a drive gear and a driven, gear whereby motion is transmitted from the drive shaft to the drive axle.

A further object is to provide means for locking the gears against movement, said locking means being released by the depression of a foot lever controlling the clutch.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is a view partly in plan and partly in section of the mechanism constituting the present invention. Fig. 2 is a section on line A—B Fig. 1. Fig. 3 is a section on line C—D Fig. 1. Fig. 4 is an enlarged transverse section through a portion of the casing and showing the double-faced gear and its operating mechanism in rear elevation. Fig. 5 is a side elevation of the connection between the rock shaft and shifting rod of the drive gear, said rock shaft being shown in section. Fig. 6 is an enlarged view showing a portion of the controlling lever in elevation and the rock shaft in section. Fig. 7 is a view partly in section and partly in elevation and showing the connection between the gear shifting mechanism and the clutch. Fig. 8 is an elevation of the guide of the drive gear.

Referring to the figures by characters of reference 1 designates the frame or chassis of the motor vehicle the rear axle 2 of which supports a casing 3 from which extends a tubular housing 4. A drive shaft 5 is mounted for rotation within this housing and is slidably engaged by the angular portion 6 of a shaft extension 7 carrying a drive gear 8. A rod 9 is connected to the shaft extension 7 in any suitable manner, as by means of a collar 10 and this rod is attached to a crank arm 11 at the inner end of a rock shaft 12. Said shaft is journaled, at its outer end, in a bracket 13 connected with the frame 1 and projects through an opening 14 formed within a lever 15. Trunnions 16 extend laterally from the rod and engage the walls of the opening 14 so that, while the shaft 12 can be rocked by means of the lever, said lever can also be swung relative to the shaft.

The shaft 17 journaled within axle 2 and to which the rear supporting wheels 18 are secured, is provided with the usual differential gear 19. A collar 20 is feathered on the axle 2 and has arms 21 extending therefrom and loosely engaging an annularly grooved hub projecting from one face of a gear 22 of novel construction. This gear is in the form of a double faced bevel gear, there being an annular series of teeth 23 upon one face thereof at its periphery while another annular series of teeth 24 is formed on the other face of the gear at the periphery thereof. Two or more additional series of annular teeth, such as indicated at 25 and 26 may be formed on the same face of the gear with the teeth 24, the several series of teeth being at different distances from the center of the gear.

A shaft 27 extends longitudinally within the frame 1 and is provided, close to the axle 2, with a crank arm 28 connected, by means of a link 29, to the collar 20. Another crank arm 30 extends from the forward portion of the shaft 27 and is connected, by means of a rod 31 to the lower end of lever 15, said connection being in the form of a universal joint or the like.

One of the arms 21, is formed with teeth as indicated at 32 and these teeth are adapted to be engaged by a pivoted dog 33 connected to and mounted within the casing 3. A rod 34 is secured to and extends from the dog and is attached to a crank arm 35 extending from a rock shaft 36 journaled within the front portion of the frame 1. Another crank arm 37 extends from this shaft 36 and is connected as by means of a rod 38, to a bell crank lever 39, one arm of this lever being attached, as by means of a link 40, to a dog 41. This dog is pivotally mounted on the casing 3 and normally engages teeth 42 extending from the rod 9. A foot lever 43 projects upwardly from the shaft 36 and a spring 44, which is attached to said lever and to the frame 1, serves to hold the lever normally elevated and the dogs 33 and 41 normally in engagement with the adjacent teeth.

The bracket 13 heretofore referred to is provided with a series of notches, such as indicated at 45 and any one of which is adapted to receive the lever 15 and thus hold it against lateral swinging movement.

Shaft 36 has an arm 46 loosely engaged by an angular member 47 extending from a yoke 48. Said yoke loosely engages the annularly grooved hub 49 of a clutch member 50, said clutch member being feathered on the shaft 5 and being mounted for rotation within a cup like clutch member 51 revoluble with the shaft of the motor 52.

Whenever it is desired to disengage the gears 8 and 22, it is merely necessary to swing the lever 15 forwardly after first releasing the dogs 33 and 41 from the teeth adjacent thereto by depressing foot lever 43. This operation will result in the withdrawal of the gear 8 from mesh with gear 22 and the operation of the motor will not, therefore, result in the driving of the rear wheels of the vehicle. To drive the machine at high speed, lever 15 is shifted laterally after the dogs 33 and 41 have been disengaged from the teeth adjacent thereto, so as to move gear 22 until the teeth 26 are brought into the path of gear 8. Lever 15 is then drawn back into the outermost notch 45, thus causing gear 8 to move backwardly until it is brought into mesh with the teeth 26. To change the gearing so as to drive at medium speed, lever 15 is swung forwardly so as to shift gear 8 out of engagement with gear 22 and is then swung laterally until the teeth 25 are brought into the path of gear 8. Said lever is then swung back into the second notch and thus causes gear 8 to move into mesh with the teeth 25. The slow speed adjustment is attained by shifting lever 15 forward to disengage gear 8 from gear 22 and then swinging said lever laterally to bring the teeth 24 into the path of gear 8 after which the lever 15 is swung back into the third notch, thus bringing gear 8 into mesh with teeth 24. The machine can be reversed by shifting lever 15 forwardly to move gear 8 out of the path of gear 22 and then shifting the lever laterally to bring the teeth 23 into the path of gear 8. By then swinging the lever 15 back to the fourth or innermost notch 45, the gear 8 can be brought into mesh with the teeth 23. It is to be understood that none of these movements of the lever can be effected unless the dogs 33 and 41 have first been disengaged from the teeth adjacent thereto.

In order that the gear 8 may be properly guided and held at all times against lateral movement relative to the gear 22, upper and lower guide rods 53 are secured within the casing 3 and extend parallel with shaft 7. These rods are engaged by the end portions of a V-shaped slide 54, shaft 7 being journaled within the apex portion of the slide. Any suitable means may be employed for preventing the shaft 7 from shifting longitudinally within the slide so that, when the shaft is moved by means of the mechanism provided therefor, a corresponding movement is imparted to the slide.

What is claimed is:—

1. Transmission gearing including separate gears, one of said gears having an annular series of teeth upon one face thereof and a plurality of annular series of teeth upon the opposite face thereof, means under the control of the operator for locking said gears against movement, and means for successively shifting the gears to place one of said gears in mesh with any series of teeth upon the other gear.

2. Mechanism of the class described, including a driven gear having an annular series of teeth upon each face thereof, a drive gear, an actuating lever, and separate means operated by said lever for shifting the driven gear to bring either series of teeth into the path of the drive gear and subsequently moving the drive gear into mesh with said series and means for automatically locking the gears against relative displacement.

3. Mechanism of the class described including a drive gear, a driven gear having annular series of teeth upon the two faces thereof, separate devices coöperating with the respective gears for locking said gears against relative movement, a motor, a clutch connection between the motor and the drive gear, and lever controlled means for simultaneously releasing the gears from their locking means and disengaging the clutch members.

4. Mechanism of the class described including a driven gear having a plurality of annular series of teeth, a rock shaft, means operated thereby for shifting said gear, a drive gear, an actuating shaft, means operated by said shaft for shifting the drive gear toward or away from the driven gear, an operating lever for rotating said shaft, said lever being mounted to swing relative to the shaft, and a connection between the lever and the first mentioned rock shaft for transmitting motion to said shaft from the lever.

5. Mechanism of the class described including a driven gear having a plurality of annular series of teeth, a rock shaft, means operated thereby for shifting said gear, a drive gear, an actuating shaft, means operated by said shaft for shifting the drive gear toward or away from the driven gear, an operating lever for rotating said shaft, said lever being mounted to swing relative to the shaft, and a connection between the lever and the first mentioned rock shaft for transmitting motion to said shaft from the lever, and separate toothed members movable with the respective gears, separate means for engaging said members to hold the gears against movement, and means for simultaneously releasing the gears.

In testimony that we claim the foregoing as our own, we have hereto affixed our signatures in the presence of two witnesses.

ROBERT GASTON HARDGRAVE.
CHARLES T. ADAIR.

Witnesses:
C. C. DAVIDSON,
HARRY H. McELROY.

---

Copies of this patent may be obtained for five cents each, by addressing the "Commissioner of Patents, Washington, D. C."